INVENTORS
Robert N. Scott &
Robert L. White
J.C. Evans
ATTORNEY

Sept. 8, 1970　　　R. N. SCOTT ET AL　　　3,527,467
SUSPENSION ACTUATED VEHICLE LEVELING SYSTEM
Filed Sept. 30, 1968　　　　　　　　　　　　5 Sheets-Sheet 2
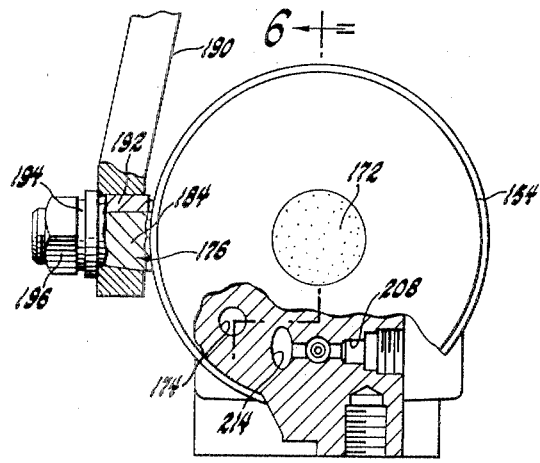
Fig.3
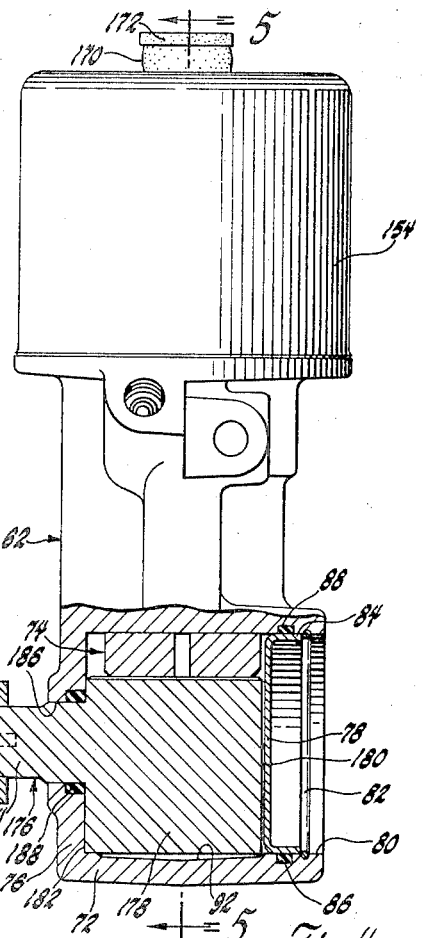
Fig.4
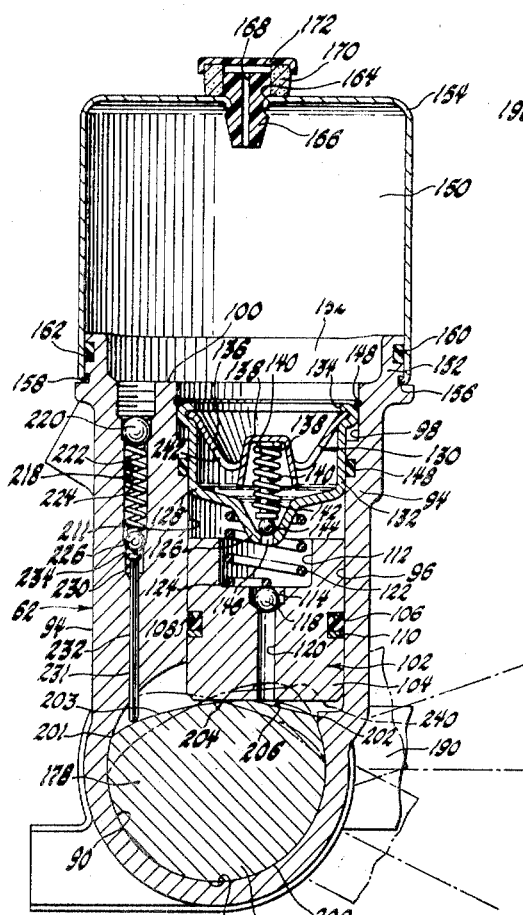
Fig.5
Fig.6
INVENTORS
Robert N. Scott &
Robert L. White
ATTORNEY INVENTORS
Robert N. Scott &
Robert L. White
J.C. Evans
ATTORNEY Sept. 8, 1970   R. N. SCOTT ET AL   3,527,467
SUSPENSION ACTUATED VEHICLE LEVELING SYSTEM
Filed Sept. 30, 1968   5 Sheets-Sheet 4

INVENTORS
Robert N. Scott &
Robert L. White
J.C. Evans
ATTORNEY

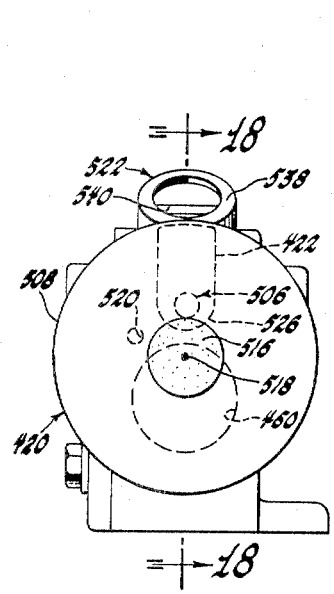
Fig.15
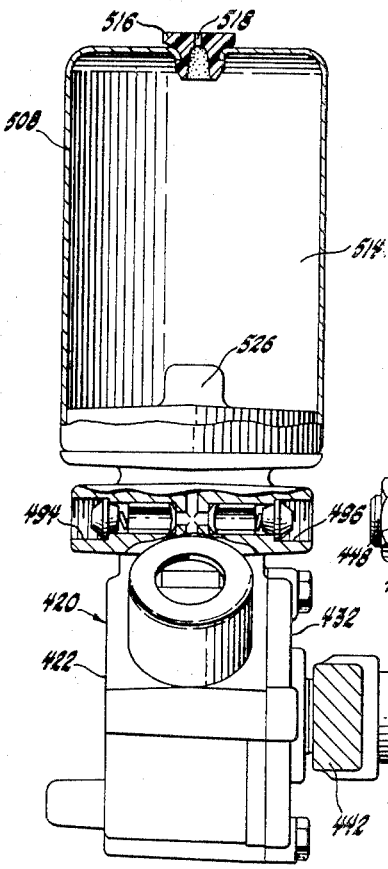
Fig.16
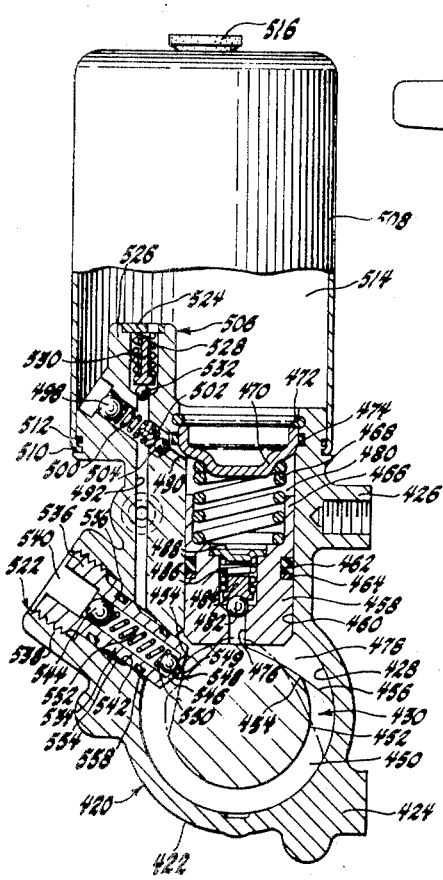
Fig.18
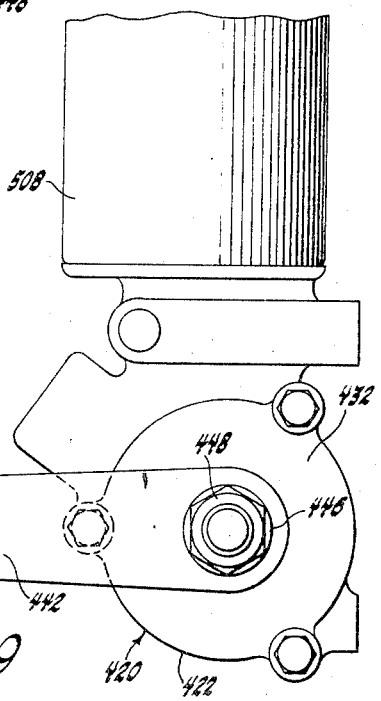
Fig.17
Fig.19
INVENTORS
Robert N. Scott &
Robert L. White
J. C. Evans
ATTORNEY

3,527,467
SUSPENSION ACTUATED VEHICLE LEVELING SYSTEM

Robert N. Scott, Saginaw, and Robert L. White, Frankenmuth, Mich., assignors to General Motors Corporation, Detroit, Mich., a corporation of Delaware
Filed Sept. 30, 1968, Ser. No. 763,834
Int. Cl. B60g 9/00
U.S. Cl. 280—6                                6 Claims

ABSTRACT OF THE DISCLOSURE

An automatically operated vehicle leveling system has a pair of extensible hydraulic cylinder and piston units, each including a fixed spring seat thereon supportingly receiving the upper end of a main coil spring having its opposite end fixed with respect to the rear axle housing. A cam operated reciprocating piston cylinder pump supplies fluid to the extensible units to adjust the vehicle chassis position with respect to the spring seat to level the vehicle. The cam is connected to means causing it to oscillate in response to vehicle road movements. The cam is configured to vary the pumping rate in accordance with vehicle loading.

---

This invention relates to vehicle suspension systems, and more particularly to automatic leveling systems of the type including a jack in series with a main suspension spring; the jack being extended to overcome main spring deflections produced by changes in vehicle static loads thereby to maintain a desired level height relationship between the vehicle chassis and its axles.

Vehicle suspension systems of the type including a primary suspension spring located between an unsprung mass such as the axle housing of a vehicle having ground engaging wheels and a sprung mass such as a vehicle chassis supported by the main suspension spring for relative sprung movement with respect to the rear axle housing will, on the occurrence of variable static loading on the vehicle chassis be susceptible to noticeable deflections in the suspension spring.

The vehicle can be leveled by means of auxiliary components such as booster springs around a shock absorber unit connected between the sprung and unsprung mass; combination shock absorber and air spring units; air pressurizable bellows located centrally of a main suspension spring between the sprung and unsprung mass and other like components. Such auxiliary components assume part of additional weight placed on the sprung mass of the vehicle and this desirably maintains the load produced deflection of the primary spring component within predetermined limits.

Certain of the auxiliary suspension components, for example, the air pressurizable load supporting bellows and like air pressurizable air spring on a combination shock absorber and air spring assembly can be automatically pressurized in accordance with changes in the static vehicle loading. These systems typically include a compressor and a reservoir for producing a predetermined pressure source from which fluid is selectively directed by plural position height control valve means into the auxiliary suspension component in response to changes in the height relationship between the sprung and unsprung mass produced by deflection of a primary suspension spring that occurs because of changes in the static vehicle loading.

While systems for automatically varying the pressurization of a supplemental load suspension component or unit take many forms, most are characterized as requiring space within the engine compartment of a motor vehicle for compressors, reservoirs or the like or modifications to low cost double direct acting hydraulic shock absorbers such as the incorporation of a flexible, inflatable sleeve around its outer periphery. In most instances many fluid couplings are required to connect components into the system all of which requires great care in installation. Further, many of the system are open to atmosphere whereby moisture and other contaminants can affect close tolerance height control valving components leading to possibly erratic operation.

In some automatic leveling systems the problem of engine compartment space limitations; open system problems; and the like as discussed above are minimized. Such systems are closed, and include a pump having a piston component relatively movable in a pumping cylinder in response to movement between the sprung and unsprung masses. However, the pump piston is maintained continuously operative upon vehicle travel and the pump stroke is constant irregardless of changes in loading on the sprung mass. Thus, even though the vehicle might be level, so long as there is relative movement between the sprung and unsprung masses of the vehicle there will be a predetermined full stroke pumping movement between the pump piston and the pumping cylinder and a resultant contant fluid discharge from the pump into the cylinder and piston leveling components of the system.

An object of the present invention is to make automatic vehicle leveling systems easily adaptable to present automobile chassis design without encroaching upon limited engine compartment space.

A further object of the present invention is to simplify automatic vehicle leveling by including a height adjusting hydraulic jack of the piston cylinder type in series with a main suspension coil spring between the vehicle chassis and its rear axle housing and by including an integral pump and reservoir assembly between the chassis and axle to supply fluid to the jack upon vehicle road movements.

Yet another object of the present invention is to provide an easily installed automatic vehicle leveling system that will adjust the vehicle chassis height to compensate for main suspension spring deflection produced by changes in static loads on the chassis and wherein the height compensation occurs without changing vehicle ride.

A further object of the present invention is to reduce wear in a continuously operated pump assembly of a closed, automatic vehicle leveling system while maintaining a desired height relationship between the sprung mass and the unsprung mass of the vehicle when static loading on the sprung mass of the vehicle is varied.

In order to attain the aforementioned objects of the present invention, one working embodiment includes a cylinder and piston type hydraulic jack on either end of a rear axle housing of the vehicle; a spring seat on each jack is supported by one end of a primary coil suspension spring having its opposite end supported on a vehicle suspension control arm pivotally secured to and extending rearwardly of the rear axle housing. The jacks are in communication through two-way flow conduits with an outlet port of a pump secured to the vehicle chassis; the pump includes a housing having a large diameter bore therein defining a sump region and the housing further includes a smaller diameter bore intersecting the sump region and defining a cylindrical pumping bore thereabove in which is located a piston member engaged by the outer peripheral surface of an operating cam rotatably received within the large diameter bore and connected to a shaft extending from the pump housing. The shaft is connected by an arm and a pivotal link to the rear axle housing. The operating cam includes a first outer peripheral curvature which engages the end of the piston when the vehicle is level and is operative in response to relative movements between the sprung and unsprung mass to produce a limited movement of the piston within the cylindrical pumping bore to reduce pump wear while reducing fluid flow to the leveling jacks. The cam profile is further configured so that when the vehicle chassis is heavily statically loaded to cause deflection in a primary coil spring, the cam shaft operating arm will be positioned to rotate the cam shaft on its longitudinal axis to locate another part of the cam profile in engagement with the pumping piston whereby the piston will have an increased stroke or travel during the same relative movements between the unsprung and sprung masses. This causes an increased flow rate from the pump under heavy loading conditions to reduce the time required to extend the jacks thereby to return the vehicle to a desired level position.

The small diameter pump housing bore has an upper open end closed by a relief valve assembly which discharges into an inverted cup-shaped reservoir secured to top of the pump housing. A cross-over passageway in the housing communicates the sump region of the pump with the top mounted reservoir which has a capacity sufficient to receive hydraulic fluid from the cylinder and piston leveling units when the vehicle is unloaded.

Further objects and advantages of the present invention will be apparent from the following description, reference being had to the accompanying drawings wherein preferred embodiments of the present invention are clearly shown.

In the drawings:

FIG. 3 is a top-elevational view, partially broken away and sectioned of the assembly of FIG. 2;

FIG. 4 is a view in front elevation of the assembly of FIG. 3 partly sectioned at the base thereof;

FIG. 5 is a view in vertical section taken along the line 5—5 of FIG. 4 looking in the direction of the arrows;

FIG. 6 is a fragmentary vertical sectional view taken along the line 6—6 of FIG. 3 looking in the direction of the arrows;

FIG. 15 is a top-elevational view of another embodiment of a combination reservoir, pump and fluid control valve assembly of an automatic vehicle leveling system in accordance with the present invention;

FIG. 16 is a rear-elevational view of the assembly in FIG. 15 partially sectioned to show the reservoir and outlet ports of the assembly;

FIG. 17 is a view in front elevation of the assembly in FIG. 15 partly broken away and partly sectioned;

FIG. 18 is a view in vertical section taken along the line 18—18 of FIG. 15 looking in the direction of the arrows; and FIG. 19 is a fragmentary view in elevation of the left side of the assembly in FIG. 15 showing the side configuration of the combination reservoir, pump and fluid control valve assembly of this embodiment of the invention.

Figures 1, 2:
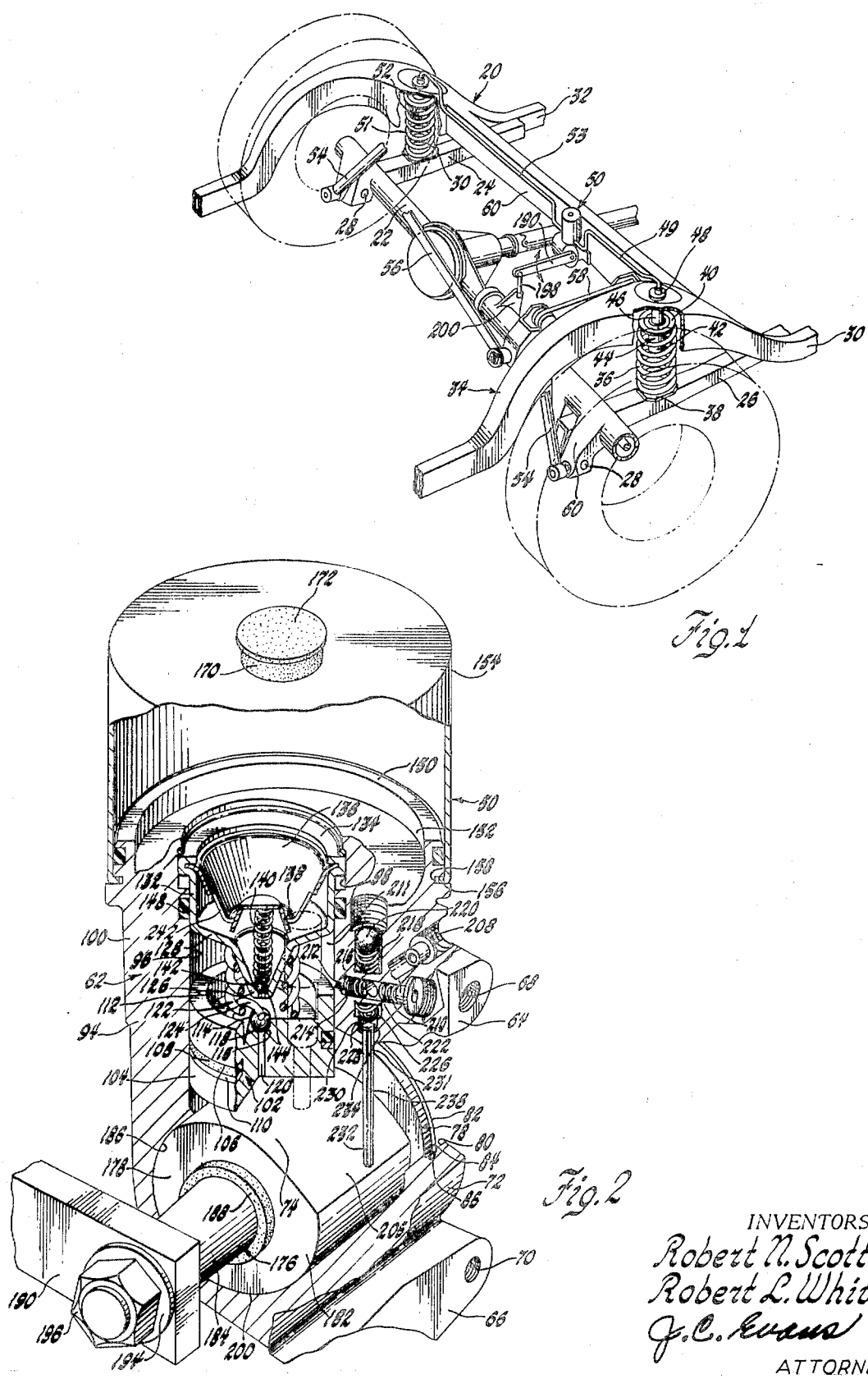
FIG. 1 is a view in perspective, partially broken away, of a rear end of a vehicle suspension system including the automatic leveling system of the present invention connected thereto.
FIG. 2 is an enlarged perspective view, partly broken away, and partly sectioned of a first embodiment of a combination pump, reservoir and fluid control valve assembly of the present invention.

Referring now more particularly to FIG. 1, a vehicle suspension system 20 is illustrated including a rear axle housing 22 representing an unsprung mass having a control arm 24, 26 located adjacent each end thereof. Each of arms 24 and 26 has one of its ends pivotally secured to housing 22 by means including a pin 28. The opposite end of each of the control arms 24, 26 is fixedly secured to side members 30, 32 of a chassis frame 34 representing a sprung mass.

The side frame member 30 is resiliently supported above the control arm 26 and rear axle housing 22 by a primary suspension spring 36 of the coil type having the lower end thereof supported in seated relationship within a recessed retaining bracket or seat 38 fixedly secured to the upper surface of the control arm 26. The opposite end of the coil spring 36 is received within a spring seat or abutment 40 that is fixedly secured to a cylindrical housing 42 of a cylinder and piston lift unit or hydraulic jack 44 in series with spring 36 and enclosed thereby. The cylindrical housing 42 slidably sealingly receives a reciprocal piston member 46 to define a pressurizable variable volume space into which hydraulic fluid can be directed to extend the jack unit 44 when the spring 36 deflects, thereby to maintain a desired trim height relationship between chassis frame 34 and housing 22. The piston 46 has the upper end thereof fixedly secured to the chassis frame side member 30 by a retaining nut 48 on a threaded upper end of the piston 46. The piston 46 has a supply passageway therethrough which fluidly connects to a supply and exhaust conduit 49 leading from a compact combination hydraulic reservoir pump and control valve assembly 50 of the present invention.

The frame 34 has its opposite side supported on housing 22 by a coil spring 51 identical to spring 36 and seated in the same manner in series with a cylinder and piston leveling unit or hydraulic jack 52 identical to jack 44 both as to construction and function. A supply and exhaust conduit 53 connects jack 52 to the assembly 50.

A hydraulic shock absorber 54 at each end of housing 22 has its opposite ends connected between housing 22 and frame 34 to control the rate at which the sprung frame 34 will move with respect to the housing 22 when the vehicle hits road bumps or the like. The illustrated vehicle suspension system further includes a transversely extending control link 56 pivotably connected at its opposite end to the housing 22 and frame 34 and a control link 58 connected between axle housing 22 and a cross-frame member 60. The link 56 is in spaced parallelism to side frame member 30 and has its opposite ends pivotally connected to housing 22 and frame 34 to allow for a controlled vertical relative movement therebetween.

The suspension including coil springs 36, 51; control arms 24, 26; shock absorbers 58 and control links 56 represent a typical vehicle suspension and is illustrative of the limited space available within this region of a vehicle for the inclusion of automatically operated vehicle leveling systems.

One feature of the present invention is its compactness which is due in part to the location of jacks 44, 52 within the available open space found in a primary, coil type, suspension spring. Further, the system utilizes a common supply and exhaust conduit from each of the jacks 44, 52 to assembly 50.

These conduits, as in the illustrated embodiment of FIGS. 1–6 can be secured to cross-frame member 60 along a straight-line path between jacks 44, 52 and assembly 50 at a location where the member 60 shields the conduits. Further the assembly 50 is dimensioned and configured to be similarly protected by member 60 when secured thereto as illustrated in FIG. 1.

Referring now more particularly to FIG. 2, the assembly 50 is shown as including a housing 62 with connecting bosses 64 and 66 on one side thereof with tapped openings 68 and 70 therein adapted to threadably receive connecting bolts directed through a fixed protected part of the frame 34 such as member 60. The boss 66 is connected to a generally cylindrically shaped base portion 72 of the housing 62.

A sump region 74 formed in the base portion 72 is closed at one end by a base portion end wall 76 and at the opposite end by a cup-shaped sheet metal end plug 78 that is held in place within an end opening 80 in the base portion 72 by a snap spring retaining ring 82 seated in a shallow annular seat formed in the end opening 80 of the base portion 72 to engage a peripheral edge of a continuously formed flange 84 on plug 78 which is coaxial of and pressed into opening 80. An O-ring seal 86 is supportingly received within a groove 88 in the base 72 around end opening 80 and located at a point axially inwardly of retaining ring 82. Seal 86 engages the flange 84 to prevent fluid leakage between it and the base portion 72 at opening 80.

The sump region 74 is in part bounded by a large diameter bore surface 90 that has a radius corresponding to that of the end opening 80. Surface 90 is best seen in FIGS. 5 and 6. The sump region 74 further includes a shallow groove 92 formed at the lower point of the large diameter bore surface 90 as best seen in FIGS. 4 and 5.

The housing 62 includes a central body segment 94 that is integrally formed with the base portion 72 to extend upwardly of the base portion 72 in close spaced relationship with the cross-frame member 60. The central body segment 94 has a bore 96 directed completely therethrough to intersect the sump region 74 at one end thereof and to merge with an opening 98 in the upper end 100 of the housing 62.

The longitudinal axis of bore 96 is slightly offset on one side of the central longitudinal axis of the central body segment 94 as best seen in FIG. 5 and it is occupied by a pump mechanism 102 that, in response to relative road induced movement between the chassis frame 34 and rear axle housing 22, will discharge a predetermined amount of hydraulic fluid into the conduits 49, 53 interiorly of hydraulic jacks 44, 52.

The pump mechanism 102 more particularly includes a reciprocal piston 104 of cylindrical form and with an outside diameter substantially equalling that of the housing bore 96. The piston 104 includes a groove 106 in its peripheral wall in which is seated an annular block V-type seal 108. A washer element 110 in the groove 106 maintains the seal 108 tightly therein and against the wall of the bore 96 thereby to seal against fluid flow bypassing the piston 104.

The upper end of the piston member 104 has a cylindrically shaped opening 112 therein that merges with a central opening 114 having a bottom surface 116 thereon defining a valve seat for an inlet ball check element 118 located within the opening 114. The opening 114 in turn is communicated with an inlet aperture 120 directed centrally through the piston member 104 into communication with the sump region 74.

Above the ball check element 118 and within the opening 112 is located a piston return spring 122 that has a lowermost coil 124 located with a portion thereof directly above and in engagement with the ball check 118 for biasing it into sealing engagement with the seat 116. The opposite end of the spring 122 fits over a depending, somewhat conoidally shaped nose 126 on a closed end of a housing 128 of sheet metal material that encloses a relief valve assembly 130. The housing 128 more particularly includes a peripheral wall 132 thereon with an upper edge 134 formed continuously therearound which is bent over into interlocked engagement with the peripheral edge of a retainer 136 having a recessed seat 138 therein in which is located one end of a coil spring 140 extending within the housing 128 from the retainer 136 to within the depending nose 126 of the valve assembly where it spring biases against a flanged end of a guide rod 142 extending coaxially therethrough.

A ball check member 144 engaged by the spring biased rod 142 is seated in the nose 126 to block fluid flow through a relief aperture 146 therein. The relief valve assembly 130 closes the upper end of the bore 96 and is maintained in sealing relationship therewith by an O-ring seal 148 that is located in a grooved part of the central body bore 96 immediately below the upper end opening 98 to sealingly engage the peripheral wall 132 of the valve housing 128 as best seen in FIGS. 5 and 6. The relief valve assembly 130 is maintained seated within the large diameter end opening 98 and the upper end of the bore 96 by a snap spring retaining ring 149 seated in a shallow recess formed continuously around the inner surface of the wall defining the opening 98.

The end opening 98 communicates with a reservoir space 150 located immediately thereabove. The space 150 is formed by an upper collar 152 on the central body 94 of the housing 62 and an inverted cup shaped, open ended cap 154. The cap 154 has a lower edge 156 formed continuously therearound bent over and seated within a retaining groove 158 in the housing 62 to tightly secure the cap 154 placed thereon. The interface between the cap 154 at the open end thereof and the collar 152 is sealed by an O-ring 160 in a grooved seat 162 formed continuously around the collar 152 to prevent leakage of hydraulic fluid from the reservoir space 150.

In the illustrated arrangement the top of the cap 154 is apertured at 164 and a resilient vent plug 166 is fastened through the apertured top to vent the interior thereof through an elongated central opening 168 in the vent plug 166 which has an annular filter 170 held in placed around the top 172 of the plug 166 thereby to preclude the entrance of foreign matter into the space 150. The reservoir space 150 has sufficient volume to accommodate hydraulic fluid flowing from the cylinder-piston leveling units 44, 52 when they are completely retracted.

The reservoir space 150 is directly communicated with the sump region 74 in the base portion 72 of the housing 62 through a cross-over passageway 174 best illustrated in FIG. 6. By virtue of this arrangement the sump region 74 has an assured supply of hydraulic fluid therein for lubricating a pump mechanism operator 176 including a cylindrically shaped cam 178 that has an end surface 180 thereon located in close spaced parallelism with the end of the end plug 78 and an opposite end surface 182 from which extends a shaft 184 directed exteriorly of the housing 62 through an opening 186 in the wall 76. An O-ring 188 supported within the wall 76 around the opening 186 is in sealing engagement with the outer periphery of the shaft 184.

The shaft 184 is connected to an operator arm 190 by a key 192 held in a recess in the outer surface of the shaft 184 and one in the arm 190 by means including a lock washer 194 and a nut 196 threadably received on a threaded end of the shaft 184 to force the washer 194 against the arm 190 and key 192 as illustrated.

Referring now to FIG. 1, the end of the actuator arm 190 opposite to the end connected to the shaft 184 is pivotally connected to one end of an interconnecting link 198 that has its opposite end pivotally connected to a connecting lug 200 on the rear axle housing 22. By virtue of the aforedescribed interconnection of the cam shaft 184 and axle housing 22, for a given relative movement between the vehicle chassis frame 34 and the axle housing 22, the cam shaft 184 will be rotated on its longitudinal axis to align the peripheral surface 200 of cam 178 angularly within the large diameter bore 90 in the base portion 72 of the assembly to produce variable stroke operation of the pump mechanism 102 and automatic operation of fluid controlling valve means to be described.

Figure 7:
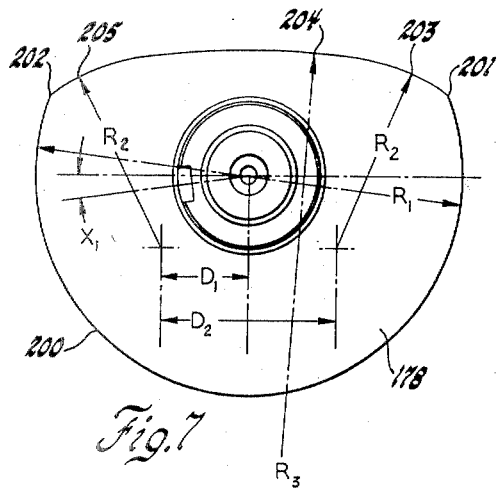
FIG. 7 is an enlarged end elevational view of a cam-shaft in the embodiment of FIGS. 1–6 for controlling dump and the pump output.

As can be seen in FIG. 7 the outer peripheral surface 200 of the cam 178 between longitudinal break line points 201, 202 on either side of the cam has a constant radius $R_1$ corresponding to that of the bore 90 whereby the cam 178 is guidingly supported throughout a substantial oscillatory movement about the axis of the shaft 184 in response to a relative movement between the sprung and unsprung masses of the vehicle. It will further be noted that the outer surface configuration of the cam has a first continuously curved segment 203 with a radius $R_2$ between break line 201 and that has a flattened curved surface 204 on top of the cam surface with a radius $R_3$. The surface 204 merges on its opposite side with a surface 205 with a radius $R_2$ to complete the cam profile. The centerline of the keyway for key 192 is located off the horizontal by an angle $X_1$.

In one working embodiment the cam configuration recited above was dimensioned in accordance with the following schedule:

CAM CONFIGURATION SCHEDULE
FIGS. 1 THROUGH 6

| | | |
|---|---|---|
| $R_1$ | inches | 1.125 |
| $R_2$ | inch | 1.000 |
| $R_3$ | inches | 4.500 |
| $X_1$ | | 7°30′ |
| $D_1$ | inch | .456 |
| $D_2$ | do | .912 |
| $X_2$ | | 20° |
| $D_3$ | inch | .75 |

Figure 8:
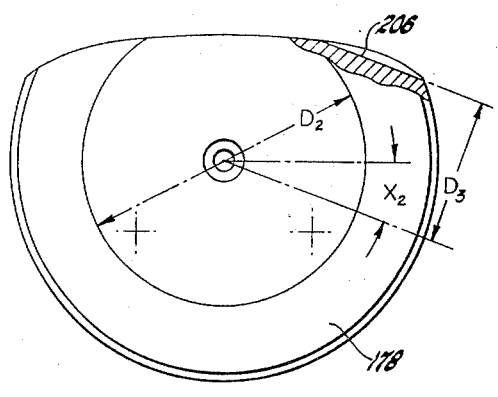
FIG. 8 is an end elevational view from the opposite end of the cam-shaft in FIG. 7.

In this arrangement the opposite end of the cam 178 has an outer profile of like dimensions and form. As seen in FIG. 8, where broken away, between ends of the cam shaft a fluid flow relief slot 206 is located in the upper outer surface where the cam shaft underlies the aperture 120 in piston 104. The slot assures clear, unrestricted passage of fluid from sump region 74 into aperture 120. As seen in the schedule the slot 206 is formed in the surfaces 204, 205 at a dimension $D_3$ taken off a line on angle $X_2$ from the horizontal centerline through cam 178. In the working embodiment these dimensions were as shown in the above schedule.

The combination assembly 50 in addition to including the pump mechanism 102 and the relief valve assembly 130 further includes an automatically operated fluid flow control and valve system. It is best seen in FIG. 2 as comprising a pair of spaced apart outlet passageways 208, 210 lying in the central body 94 both of which communicate with a variable volume pumping chamber 211 formed above the upper end of the pump piston 104 and below the relief valve assembly 130. The passageway 208 intersects the passageway 210 immediately downstream of a ball check element 212 in the passageway 210 that is biased by a spring element 214 against a valve seat 216 in the passageway 210 to preclude back flow of fluid from the passageways 208, 210 into the variable volume pumping chamber 211. The passageways 208, 210 are connected in the system by conduits 49, 53 to jacks 44, 52 respectively.

Additionally, the valve control system includes a vertically directed fluid dump passageway 218 in the central body 94 at a point offset with respect to the bore 96 as best seen in FIG. 5. This passageway 218 intersects passageways 208, 210 to be in direct fluid communication therewith and it is closed at an upper end thereof by a spherical plug 220 that is pressed into a tapped opening in the central body 94. A coil spring 222 located in a large diameter portion 224 of the dump passageway 218 has one end thereof in engagement with the spherical plug 220 and the opposite end thereof in engagement with a ball check element 226 that is sealingly biased against a valve seat 228 at the bottom of the portion 224 where it merges with a drain opening 230. A small diameter passageway 231 portion of the passageway 218 connects opening 230 with the interior of the sump region 74. An elongated valve lifter stem 232 in passageway 218 engages the curved peripheral segment 203 of the cam 178 and a head 234 on the lifter stem is located in the drain opening 230 below check element 226. When the stem is raised by the lifting action of the cam 178 it forces element 226 upwardly from the seat 228 against the biasing action of the spring 222. The lifter stem 232 is configured to have restriction slots 238 therein to communicate the large diameter passageway 224 with the smaller diameter passageway portion 231 to allow a controlled, slow bleed of flow from the intersecting flow passageways 208, 210 into the sump region 74 during a "dump" phase of operation to be discussed.

In the embodiment of the invention illustrated in FIGS. 1 through 6 the pump mechanism operator 176 is illustrated in a position assumed when the vehicle chassis 34 is in a desired trim height relationship with respect to the unsprung mass represented by the rear axle housing 22. This locates the relatively flat curved segment 204 of the cam 178 in engagement with the bottom of the piston 104 as best seen in FIG. 5.

Normal road induced movements between chassis 34 and axle housing 22 will produce an arcuate movement of the actuator arm 190 on either side of a horizontally disposed center line through the arm 190. This will produce a like oscillation of the cam 178.

By virtue of the above-described cam configuration and its relationship to piston 104 and in accordance with certain principles of the present invention pump wear is reduced and pump discharge rates are matched to the degree of vehicle loading to produce quicker jack leveling for heavier loads.

To appreciate these aspects of the invention, several phases of operation of the device will be discussed including: Level; Leveling; Relief; and Dump.

LEVEL

When the vehicle chassis is at a desired trim height relationship with the vehicle axles, i.e., at a level attitude, the operator arm is, in the working embodiment of FIGS. 1–6, horizontally disposed as seen in FIG. 5. This occurs for example when the vehicle is unloaded or leveled following loading. Under this condition it is clear that only minimal flow of fluid occurs from the pump mechanism 102 to jacks 44, 52. Under these conditions, the flat curved segment 204 on the cam 178 is the portion of the cam profile that lifts the piston 104. The piston stroke is reduced because of the radius of segment 204. Ordinary road movements cause the cam 178 to oscillate from curved segment 204 to either surface 203 or 205. Thus, there is short stroke piston travel and pump discharge during periods when the vehicle is level, this being the case during the greatest part of vehicle use. Accordingly, pump wear between piston and cylinder is reduced.

More particularly, the slight piston lift during discharge stroke movement of piston 104 will force hydraulic fluid from pumping chamber 211 through check valve 212 into passageways 208, 210 which are connected by conduits 49, 53 respectively for supplying hydraulic fluid to the jacks.

Following the discharge stroke of the piston 104, spring 122 will force it downwardly as the cam 178 moves back to its vehicle level position shown in FIG. 5. During this return movement expansion of pumping chamber 211 draws fluid from sump region 74 through aperture 120 and across inlet check valve 118 into chamber 211. This constitutes the suction stroke of the pump mechanism 102. Make-up fluid for the hydraulic fluid-filled sump region 74 is supplied from reservoir space 150 through cross-over 174.

The reduced fluid flow to the jacks 44, 52 limit the rate of extension of pistons 46 upwardly of cylindrical housings 42 yet eventually the chassis frame 34 is moved upwardly of the rear axle housing 22 thereby to shift the chassis frame 34 from a desired level trim height position.

On the occurrence of such a movement the actuator arm 190 will be moved by the link 198 downwardly with respect to the cross frame member 52 thereby to cause rotation of the cam shaft 184 on its axis and a commensurate rotation of the cam 178 in the large diameter bore 90 in a clockwise direction as viewed in FIG. 5 to cause the point 201 on the outer periphery of the cam 178 to move toward the lower end of the lifter member 232 thereby to raise it to engage the ball check valve 226 upwardly of the valve seat 228.

This directly communicates the intersecting outlet passageways 208, 210 with the sump region 74 allowing excessive fluid in the cylinder piston leveling units to dump to the sump region 74 thereby to retract the pistons 46 of the jacks 44, 52. This allows the sprung chassis frame 34 to return to its desired trim height position assumed for purposes of this discussion as level.

LEVELING

A second phase of operation of the embodiment of the invention illustrated in FIGS. 1 through 6 occurs when the chassis frame 34 is initially heavily loaded, as for example, when passengers first enter the car. Under these conditions the primary suspension springs 36, 51 will deflect as much as two inches. This will cause the chassis frame 34 to move closer to the rear axle housing 22 and the front end of the chassis frame 34 will be raised upwardly in a pivotal movement about a pivot point substantially defined by the primary suspension springs 36, 51. Under this condition the link 198 on the rear axle housing 22 will force the link connected end of the actuator arm 190 in an upward angular movement from its level position shown in FIGS. 4 through 6. In the working embodiment of the invention in FIGS. 1 through 6 when the load is sufficient to cause two inches of deflection in springs 36, 51 the cam 178 will be rotated counterclockwise through twenty degrees. This will cause the point 202 on the cam 178 to assume the position shown in dotted line at 240 in FIG. 5.

Now when the actuator arm 190 is swung by normally road induced movements, the cam profile is configured to produce a long stroke piston travel both on discharge and suction strokes. For example, with a full swing from horizontal to twenty-five degree raise, the piston 104 will discharge .40 cubic inch per minute. This pumping rate is greater than that occurring under conditions when the vehicle is in its desired trim height position and the greater amount of fluid flow will pass through the outlet passageways 208, 210 into the jack leveling units 44, 52 to cause quicker leveling of the chassis frame 34. Hence the spring chassis frame 34 will be raised about the pivot point defined by the primary suspension springs 36, 51 to be returned to a desired level trim height position with respect to the rear axle housing 22 and the front vehicle axle.

RELIEF

Under certain operating conditions the chassis 34 may be loaded to an extent that the primary suspension springs 36, 51 are deflected to a point where full piston extension will not return the chassis to a level position. Under these conditions the pressure level in the variable volume pumping chamber 211 will eventually reach a point where the ball check element 144 will be forced upwardly against the return action of the coil spring 140 to allow fluid flow through the relief aperture 146 to the interior of the relief valve assembly 130 thence through openings 242 in the retainer member and thence into the main reservoir space 150.

The pump mechanism 102 will continue to draw fluid from the sump region 74 and return it directly into the reservoir space 150 for return to sump region 74 through cross-over 174. This bypasses the fully extended jacks until the overload condition on the chassis frame 34 is removed.

DUMP

When any load, whether it be a standard load or an overload, is removed from a leveled chassis frame 34, it will be raised by the primary coil suspension springs 36, 51 upwardly of the rear axle housing 22 and the chassis frame 34 will be disposed with its front end lower than the point thereof being raised by the primary suspension springs 36, 51. The resultant raised, out-of-level attitude will cause the link 198 between the fixed reference point represented by the rear axle housing and the movable suspended mass represented by the cross-frame member 60 of the chassis 34 to pull the link connected end of the actuator arm 190 down thereby to rotate the cylindrically shaped cam 178 clockwise as viewed in FIGS. 5 and 6 thereby to advance the point 201 on the peripheral surface of the cam 178 against the bottom end of the valve lifter member 232. The lifter member 232 is thereby raised axially within the small diameter passageway 231 until the upper head 234 thereon engages the ball check element 226 to raise it from its valve seat 228. By virtue of the fact that the dump passageway 218 directly intersects the passageways 208, 210 as best seen in FIG. 2, the high pressure fluid in the cylinder-piston leveling jack units 44, 52 will flow through the outlet passageways 208, 210 and the dump passageway 218 around the raised valving element 228 and thence through the restricted passageway 238 into the hydraulic fluid filled sump region 74 thence upwardly through the cross-over passageway 174 into the reservoir space 150.

The restricted dump path defined by passageways 238 assures that momentary dynamic excursions of the cam 178 in a direction to raise the valve lifter 232 will not immediately empty the jacks. Rather, the flow of hydraulic fluid bleeds back to the sump region 74 at a rate that requires the cam 178 be shifted and maintained continuously in its dump position as is the case when the vehicle static load is reduced.

Figure 11:
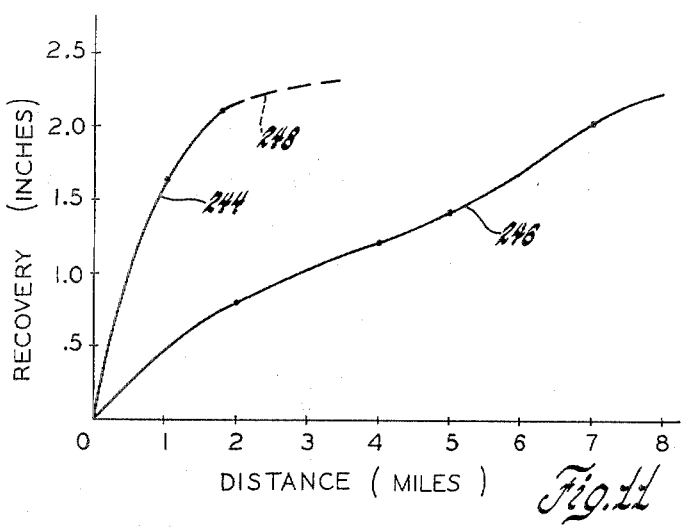
FIG. 11 is a graph showing vehicle travel distance versus leveling movement of the embodiment in FIGS. 12 through 14 under different road conditions.

As shown in the graph of FIG. 11, with a system of the above-described type, leveling occurs more rapidly on rough secondary roads as seen in curve 244. In curve 246 the leveling action is shown for the case where the vehicle travels over smooth interstate highways. The non-linear pumping rate for each type road is due to the above-discussed cam profile differences. The quicker recovery over rough roads is produced by the more frequent and greater distance of relative movements of the sprung mass and unsprung mass in the system produced by washboard surfaces traversed by the vehicle.

An important point to note is that the recovery rate decreases as the vehicle approaches a level trim height position. This is represented by a dotted line extension 248 of curve 244 which begins to quickly flatten once the vehicle is level at 1.7 miles of travel. Accordingly, there is little over-pumping even under rough road conditions. This is due to the slight piston lift produced by curved cam segment 204 as discussed above.

Figure 12:
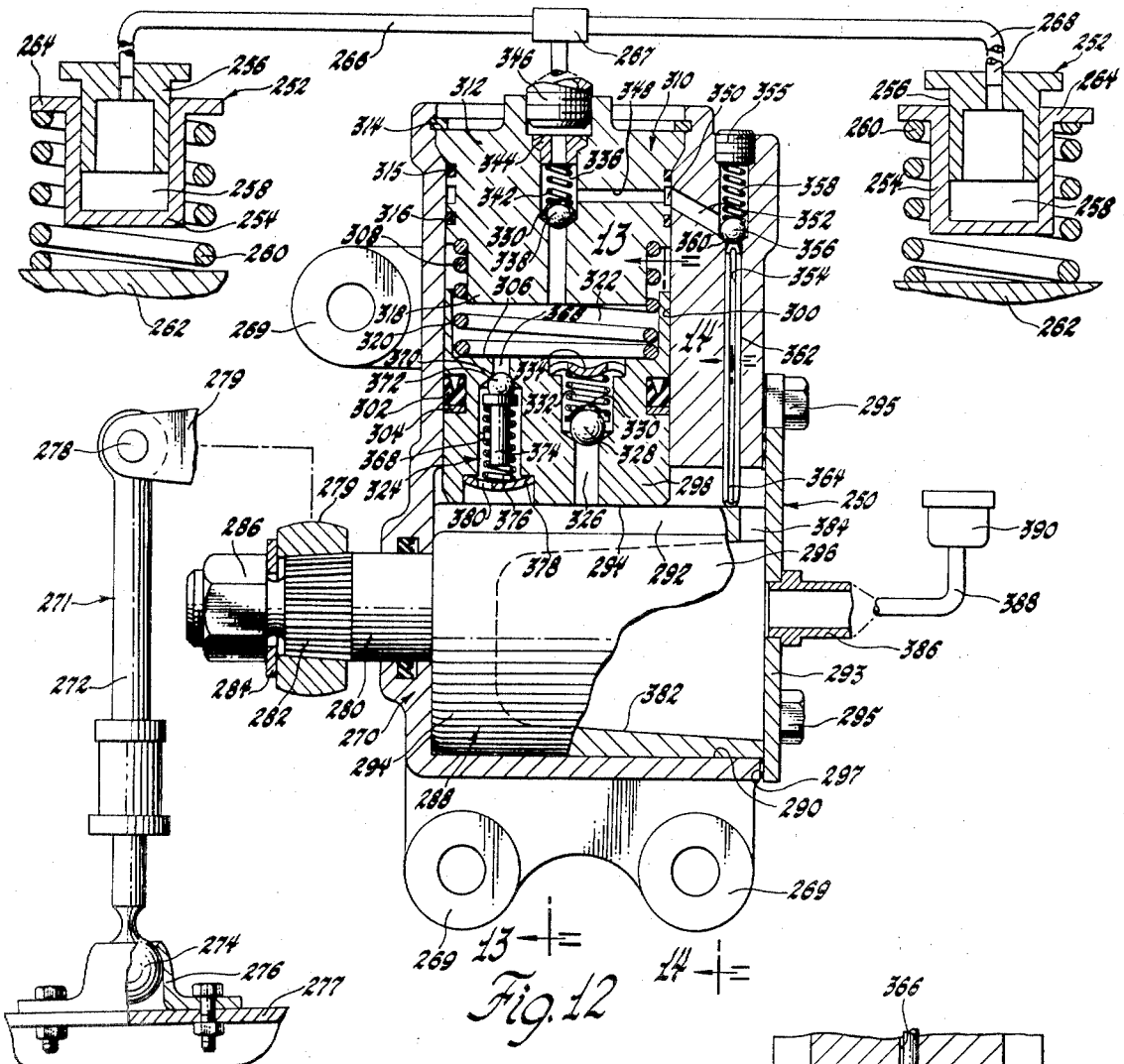
FIG. 12 is a diagrammatic view of another embodiment of the inventive automatic leveling system including a combination pump and fluid control valve assembly shown in vertical section.
Figure 13:
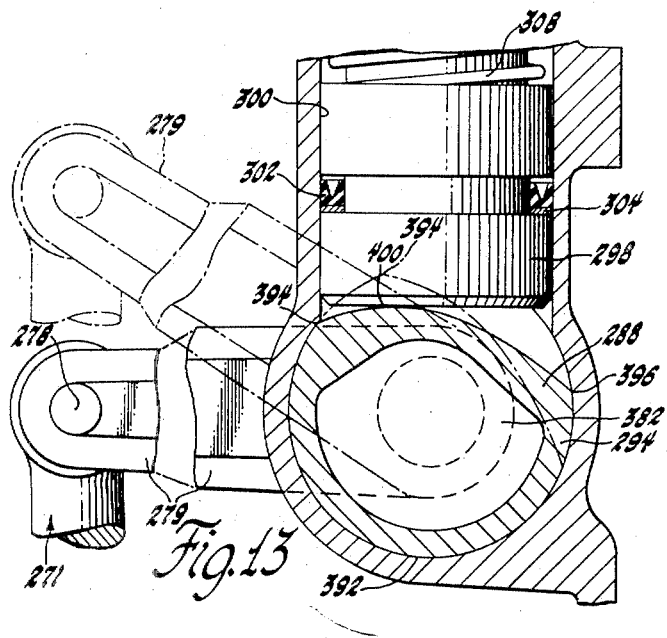
FIG. 13 is a vertical sectional view taken along the line 13—13 of FIG. 12 looking in the direction of the arrows.
Figure 14:
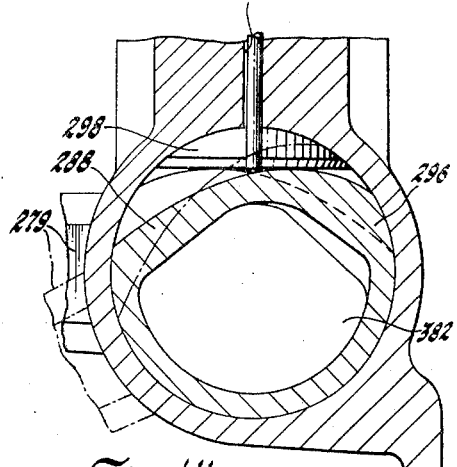
FIG. 14 is a view in vertical section taken along the line 14—14 of FIG. 12 looking in the direction of the arrows.

In FIGS. 12 through 14 another embodiment of the invention is illustrated including a combination hydraulic pump and reservoir 250 for supplying hydraulic leveling jacks 252 located on either end of a rear axle of a vehicle like that in the first embodiment. Each of the jacks 252 includes a cylinder 254 and a piston 256 together forming a variable volume fluid fill control chamber 258.

As was the case in the first embodiment, each of the jacks 252 is associated with a coil type primary suspension spring 260 having one end thereof supportingly received by an unsprung mass, for example the rear axle housing 262 of the vehicle. The upper end of each primary suspension spring 260 engages a peripheral flange 264 on the upper end of the cylinder 254. The flange 264 serves as a seat for the spring 260 and to arrange the vehicle leveling jack 252 in series with the spring 260. Thus, when the spring 260 is deflected, as was the case in the first embodiment, the jack unit 252 can be operated by directing pressurized hydraulic fluid into its variable volume control chamber 258 so as to extend the piston 256 outwardly of the cylinder 254 a distance to compensate for the aforementioned spring deflection. This returns the vehicle chassis to a desired trim height.

In the illustrated arrangement, the hydraulic jack unit 252 on one side is connected to one end of a conduit 266 having the opposite end thereof connected to a fluid fitting 267 connected to the outlet of the combination pump and reservoir assembly 250. Likewise the hydraulic jack 252 on the opposite side of the vehicle is connected to one end of a fluid conduit 268 having its opposite end connected to the fitting 267.

A plurality of lugs 269 extending from a housing 270 of the unit 250 are adapted to be secured to a portion of the sprung mass such as a cross-frame member of the chassis as illustrated in the first embodiment. Unit 250 is in turn connected by an operating linkage system 271 to a portion of the unsprung mass of the vehicle. The system 271 comprises an upstanding link member 272 having a spherically-shaped ball 274 on the bottom end thereof supportingly received for universal movement with a socket member 276 fixedly secured to a frame member 277 associated with the unsprung mass of the vehicle. The upper end of the link 272 is connected by a pin 278 to one end of an actuator arm 279. A cam shaft 280 extends from the housing 270 and includes a splined end 282 upon which the opposite end of the actuator arm 279 is fit and fixedly secured against rotation by means including a lock washer 284, and a nut element 286 threaded on to the end of the shaft 280.

A hollow, cylindrically shaped cam 288 is secured to the shaft 280 and located within a lower housing bore 290 which defines a lower sump region 292 having an open end closed by a cover 293 secured to the housing by a plurality of fastening elements representedly shown as screws 295. The cover is sealed about its periphery by a gasket member 297. The cylindrically shaped cam 288 includes a pump operating segment 294 and a system dumping segment 296 each having a distinctive cam profile to be further discussed.

The pumping cam segment 294 underlies a piston 298 that is slidably received for reciprocation within a pump bore 300 in the housing 270 above and in intersecting relationship to the lower housing bore 290. The periphery of the piston is grooved to receive an annual seal member 302 of a V-shaped configuration which is held in place within the peripheral groove of the piston 298 by a washer 304. The upper end 306 of the piston 298 is in engagement with the lower end of a return spring 308 which has the opposite end thereof in engagement with a plug 310 that closes the open upper end of the pump bore 300. A large diameter head 312 on the plug 310 is seated in the housing 270 and held in place therein by a snap ring 314 that seats in a shallow internal groove of the housing 270. The plug head 312 is recessed to carry a pair of spaced apart O-ring seal elements 315, 316 that seal the periphery of the plug with respect to the pump bore 300. The plug 310 further includes a stem 318 which is arranged coaxially within an opening defined by a skirted upper end 320 on the piston 298.

The space between the stem 318 on the plug and the skirt 320 on the piston 298 constitutes a variable volume pumping chamber 322.

The unit 250 includes a relief valve assembly 324 carried by the movable piston member 298. Further the piston 298 has an intake passageway 326 for communicating the sump region 292 with the variable volume chamber 322. An intake ball check valve element 328 is seated within the passageway 326 to block flow therethrough during upward movement of the piston 298 within the pump bore 300 during a discharge stroke of the mechanism.

In the illustrated arrangement, the intake ball check 328 is maintained in its seated position by means including a cup 330 of hemispherical shape surrounding the upper surface of the ball 328 and including means thereon defining a seat for a spring member 333 having the opposite end thereof in engagement with a perforated plug or spring retainer 334 fastened in the upper end of the piston 298. During the suction stroke of the piston 298 as it is forced by the return spring 308 downwardly within the pump bore 300, the ball element 328 moves upwardly of its seat allowing direct fluid flow communication between the expanding volume chamber 322 and the fluid filled sump region 292.

A discharge passageway 236 in the plug 310 includes a ball check element 338 having its upper surface received in a cup 340. A coil spring 342 engages a cup 340 and a connector 344 to maintain the ball check 340 against its seat to prevent backflow of hydraulic fluid from the hydraulic jacks 252 through the conduits 266, 268.

The ball check 338 will be lifted from its seat by fluid being discharged from the variable volume pumping chamber 322 during the discharge stroke of the piston 298. In the illustrated arrangement the T-fitting 267 of the fluid network is diagrammatically shown as being connected to a conduit 346 threadably received within the upper end of the plug 310 to thereby direct such discharged hydraulic fluid to the jacks 252 via conduits 266, 268.

A transverse dump passageway 348 in the plug 310 intersects the discharge passageway 336 above the seated check valve element 338 and it also intersects a peripheral groove 350 in the plug 310 between the spaced apart seal elements 315, 316 therein. The groove 350 communicates with a downwardly inclined passageway 352 in housing 270 that in turn joins to a vertically aligned hydraulic fluid dump bore 354 closed at its upper end by a pipe plug 355. The dump bore 354 flows into the lower sump region 292 to thereby complete a direct fluid path from the jacks 252 for exhaust of excessive fluid in the jacks.

This direct path is normally closed by a ball check element 356 biased by a coil spring 358 into sealing engagement with a seat 360 formed at the intersection of the inclined passageway 352 with the dump bore 354. During a dump phase of operation corresponding to that previously described in the operation of the first embodiment of the invention, a valve lifter pin 362 in the bore 354 is litfed upwardly by the dump cam segment 296 to raise the ball check element 356 from its seat.

The lifter pin 362 has a plurality of ribs 364 extending along the length thereof that space the peripheral surface of the pin 362 from the wall of the dump bore 354 to form a restricted flow path 366 along its length as partially shown in FIG. 14.

Referring now more particularly to the relief valve assembly 324 included in the piston 298, it comprises a relief port 368 extending through the length of the piston 298 to communicate the variable volume pumping chamber 322 with the lower sump region 292. A valve seat 370 in the port 268 is normally engaged by a ball check element 372 that is held in place to prevent flow through the port 362 by a guide pin 374 having a head in engagement with the ball check element 372 and being surrounded by a high pressure relief spring 376 having one of its ends carried by the head of the guide and its opposite end in engagement with a retainer plug 378 with an aperture 380 therein.

To supply adequate hydraulic fluid volume to fully extend the jacks 252 to compensate for deflections in the primary spring units 260, in this embodiment of the invention the reservoir space is in part provided by an opening 382 in the hollow cam 288 which extends through most of the length of the cam 288 and is closed by the cover 293. The opening 382 has a cross-sectional outline like that of the cam surface and is communicated with the sump region 292 at the outer periphery of the cam 288 through an opening 384 included in the upper surface of the dump cam segment 296 as best seen in FIG. 12.

A fitting 386 secured to the cover 293 is connected by a conduit 388 to a hydraulic fluid reservoir 390 that supplies any make-up fluid required in the system. In the illustrated arrangement the reservoir 390 further defines a fluid volume capacity sufficient to accommodate hydraulic fluid dumped from the leveling jack units 252 when they are completely retracted.

Figure 9:
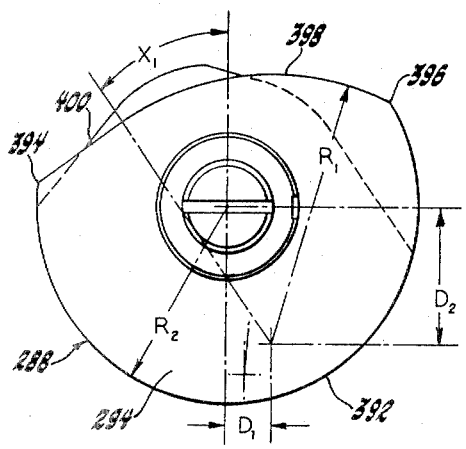
FIG. 9 is an enlarged end elevational view of a cam-shaft used to control like functions in an embodiment of the invention shown in FIGS. 12 through 14.

To fully appreciate the operational mode of this embodiment of the invention, further consideration of the profile of the cam 288 is necessary. Accordinglyly, reference is now made to FIGS. 9 and 10 wherein the cam segments 294, 296 are explicitly set forth. FIG. 9 is an end elevational view of the cam 288 along with the shaft extension thereon, when the cam is removed from the lower housing bore 290. The cam is shown in the position it assumes when the vehicle is level and corresponds to the position of the cam shown in FIGS. 12–14.

As seen in FIG. 9, the pumping cam segment 294 has a constant radius bottom peripheral surface 392 thereon extending from a transitional line 394 along one side of the cam segment 294 to a second transitional line 396 on its opposite side. In a clockwise direction from transitional line 394 the cam segment 294 has a flat surface 400 that is tangent to a curved surface 398 normally engaging the end of piston 298. The surface 400 and the surface 392 intersect to define the previously mentioned first transitional line 394 and surfaces 398, 392 intersect to define transitional line 396.

Figure 10:
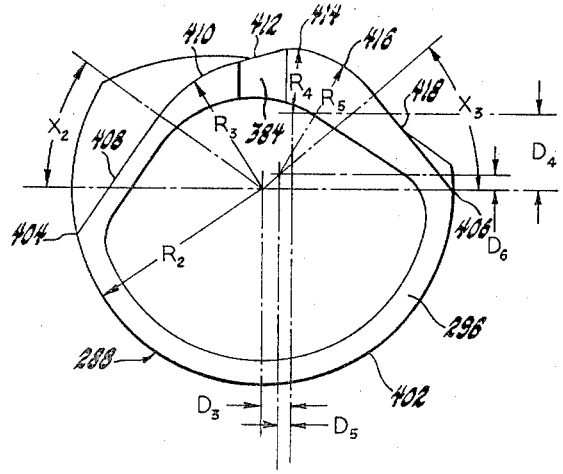
FIG. 10 is an elevational view from the opposite end of the cam-shaft in FIG. 9.

In FIG. 10 the dump cam segment 296 is best illustrated as including a lower peripheral surface 402 of constant radius corresponding to the surface 392 on the cam segment 294. This surface 402 runs from a transitional line 404 on one side of the segment 296 to a transitional line 406 on the opposite side thereof.

The upper peripheral surface of the cam segment 296 clockwise from the transitional line 404 includes a flat surface 408 that is tangent to a surface 410 which merges with a flat surface 412 through which the previously described cam opening 384 passes. The highest point on the cam profile is defined by a relatively short curved surface 414.

The curved surface 414 merges with a descending surface 416 which merges with a flat surface 18 extending to the transitional line 406.

The values of the various radii and angular extents of the plural surfaces of the cam segments 294, 296 shown in FIGS. 9 and 10 and included in the working embodiment of FIGS. 12 through 14 are as set forth in the following schedule:

CAM CONFIGURATION SCHEDULE
FIGS. 12 THROUGH 14

| | | |
|---|---|---|
| $R_1$ | inches | 1.400 |
| $R_2$ | inch | 1.000 |
| $D_1$ | do | .260 |
| $D_2$ | do | .700 |
| $X_1$ | degrees | 35 |
| $R_3$ | inch | .657 |
| $R_4$ | do | .318 |
| $R_5$ | do | .644 |
| $D_3$ | do | .146 |
| $D_4$ | do | .398 |
| $D_5$ | do | .090 |
| $D_6$ | do | .076 |
| $X_2$ | degrees | 35 |
| $X_3$ | do | 40 |

By virtue of the above-described configuration of the cam segments 294, 296, this embodiment of the invention will, during its operation, include a reduced piston travel when the vehicle is level; a greater piston travel during periods when the vehicle is heavily loaded to cause substantial deflection in the primary suspension springs 260 to be quickly corrected; a built-in capability to sense the height of the vehicle chasses and to dump hydraulic fluid from the lift units when the vehicle is unloaded so as to cause the chassis to be raised above a desired trim height; and a built-in capability to relieve excessive pressure conditions within the pumping mechanism under certain operating conditions.

More particularly during periods when the vehicle is level, which occurs during most times that the vehicle is used, the pumping cam segment 294 will assume the solid line position in FIG. 13. This is because the actuating arm 279 is substantially horizontal as illustrated and substantially perpendicular to the interconnecting link member 272. Under these conditions the lower end of the reciprocating piston 298 is in engagement with the relatively flat radius surface 398. Normal road movements of the vehicle will cause the cam segment 294 to oscillate about the longitudinal axis of the cam shaft 280 without causing any great movement of the piston 298.

If, however, the vehicle is heavily loaded and the primary suspension springs 260 subjected to a substantial deflection causing the chassis of the vehicle to be moved from its desired trim height position, the link 272 and actuator arm 279 will assume the dotted line position shown in FIG. 13 thereby to cause the cam segment 294 to rotate clockwise to the illustrated dotted line position.

In the dotted line position the transitional line 394 on the cam segment 294 is shifted to cause a greater distance of piston travel for a corresponding angular road induced movement of the actuator arm 279. Hence, a greater amount of hydraulic fluid will be discharged from the variable volume pumping chamber 322 for the same kind of road induced movement to produce quicker transfer of hydraulic fluid into the control chamber 258 of each of the hydraulic jack units 252. This will cause a quick extension of the pistons 256 with respect to the cylinders 254 thereby to compensate for the aforementioned spring deflection.

The flat surface 400 accentuates the degree of piston travel for a given road induced movement to accomplish the intended purpose of quicker leveling.

The dump phase of operation in this embodiment occurs when the actuator arm 279 moves into the dotted line position shown in FIG. 14. This occurs, for example, when the vehicle is unloaded causing the springs 262 to return to their original height. The series supported jacks, however, are extended and the combination of the undeflected primary suspension springs 260 and extended jacks will raise the rear of the vehicle chassis above its desired trim height.

When the arm 279 is in the dotted line position in FIG. 14 the dump cam segment 296 will be moved to the dotted line position illustrated in FIG. 14 where the surfaces 414, 416 on its upper outer periphery will shift the valve lifter pin 362 upwardly to move the ball check element 356 from its seat to allow fluid flow from the control chambers 258 of each of the jacks 252, thence to conduits 266, 268, the fitting 267, the discharge passageway 336 above the check valve 338, thence to the transverse dump passageway 348 and into the dump bore 354 that is in communication with the sump region 292, the opening 384 and thereby back to the reservoir 390.

During the dump phase the restricted flow path 366 will control the flow of fluid from the jacks 252 so that they will not immediately be retracted. This feature is included to prevent instant dumping of jacks 252 when substantial road induced excursions between the sprung and unsprung mass of the vehicle and a resultant wide swing rotation of the cam 288 causes the valve lifter pin to be moved upwardly along with check element 356 for a relatively short transitional period of time during such movements.

In this embodiment excessive pressure build-up is relieved directly from the pumping chamber 322 through the relief valve assembly 324 to the outer upper surface of the cam 288 which has sufficient lateral clearance with the housing 270 as seen in FIGS. 13 and 14 to allow fluid flow back to the sump region 292, the openings 384, 382 thence to the reservoir 390.

When the above-described embodiment of the invention was used on a station wagon type vehicle loaded to 1200 pounds the following results were observed. The load caused a deflection of 2.2" between the axle and the frame under one set of operating conditions. With this deflection, after 8 miles of driving on interstate type highways, it was observed that the vehicle was returned to a desired level trim height position. After this fluid was dumped from the hydraulic lifts, the 1200 pound load was again put in the wagon. It was observed that the spring deflection was 2.1" between the vehicle axle and its frame. After 1.7 miles on a rough secondary road, the wagon was again level.

Accordingly, it is clear that the more the axle bounces with respect to the frame, the faster the vehicle will level. The graph in FIG. 11 includes all data run on the test vehicle under two sets of operating conditions. It is representative of results obtained during operation of all embodiments of the invention.

A third embodiment of the invention is shown in FIGS. 15 through 19. These figures illustrate a combination pump reservoir and control valve assembly 420 of a unitary design corresponding to a similar unitary design of such an assembly set forth in the embodiment in FIGS. 1 through 6. It is intended for use with a like vehicle suspension system and produces a leveling action corresponding to that of the unitary, plural function assembly included in the system shown in the first embodiment.

The assembly 420 more particularly includes a housing 422 with mounting lugs 424, 426 on one side thereof which are tapped to receive screws (not shown) for fastening the housing 422 to a part of the vehicle suspension such as a vehicle chassis frame cross member of the type shown at 60 in the first embodiment. A lower housing bore 428 supportingly receives an operating cam 430. The bore 428 has an open end closed by a cover 432 through which extends a cam operating shaft 434 connected to the cam 430. The cam shaft is sealed where it passes through the cover 432 by an O-ring seal 436 that is held in a seated relationship wtihin a recessed inner surface of the cover 432 by a washer 438.

The outboard end of the cam shaft 434 is tapered at 440 and is connected to one end of actuating arm 442 by a key element 444 held in place by a washer 446 along with a nut 48 threadably received on the outermost end of the cam shaft 434.

The cam 430 includes a lower curved surface 450 that is slidably rotatably supported by the inner surface of the bore 428. The cam 430 further includes a reduced diameter central segment 452 with an outer peripheral surface including a transitional nose configured point 454 that has a much greater rate of curvature than an upper peripheral surface 456 on either side thereof that represents the pumping cam configuration of the cam 430.

The upper peripheral pumping cam surface 456 engages the lower end of a piston member 458 that is slidably received within a pumping bore 460 within the housing 422 for relative reciprocation with respect thereto.

The piston 458 includes a grooved periphery in which is seated an annular O-ring seal 462 held in place by an annular washer 464. The piston includes an upper end skirt 466 that surrounds one end of a return spring 468 having the opposite end thereof seated against a sheet metal plug 470 that closes an open end of the bore 460 and is held in place therein by a snap ring 472. The plug 470 has its periphery sealed by an O-ring member 474 seated in a groove formed around the inside surface of bore 460 at the upper end thereof.

An intake passageway 476 communicates a lower sump region 478 formed between the cam 430 and lower housing bore 428 with a variable volume pumping chamber 480 defined between the plug 470 and the reciprocating piston 458.

A ball check valve 482 is seated in the passageway 476 by means including a guide 484 and a coaxially aligned coil spring 486 that biases the guide 484 downwardly against the ball to maintain it seated. A perforated retainer 488 is held in the upper end of the piston 458 to hold the spring 486 in place.

A discharge passageway 490 in the housing 422 intersects with the bore 460 and extends in an upwardly inclined direction to intersect a vertically directed housing passageway 492 serving the plural functions of a fluid relief path; a fluid dump path as well as a fluid discharge path to openings 494, 496 extending laterally through the housing on the rear face thereof as best seen in FIG. 16. Each of the transverse openings 494, 496 are adapted to be connected to conduits leading to and from hydraulic leveling jacks of the type fully discussed in the previous two embodiments of the invention.

The inclined discharge passageway 490, after intersecting the vertical passageway 492, increases in diameter and is closed by a ball plug 498. A coil spring 500 engages the plug and a guide pin 502 that in turn maintains a discharge ball check element 504 against a seat in the passageway 490 during all phases of operation except when fluid is being discharged from the chamber 480 as occurs when the piston 458 is moved upwardly toward the plug 470.

An upper open end of the vertical passageway 492 merges with a relief valve assembly 506 that controls pressure build-up in the passageway 492. When an excessive pressure is present, hydraulic fluid is discharged interiorly of an inverted cup-shaped housing 508 that has its open ended edge bent over at 510 and secured to an annular groove on the upper end of the housing 422. This end of the housing 508 is sealed by an annular O-ring 512 in the housing 422.

The interior of the housing 508 defines a reservoir space 514 which is vented by a plug 516 directed through the top of the housing 508 and having a restricted opening 518 therethrough.

In FIG. 15, portions of the housing 422 including the relief valve assembly 506 and the discharge control valve assembly have their outlet shown in dotted lines to show their relationship to the pump bore 460, a cross-over passageway 520 that extends completely through the housing 422 between the reservoir space 514 and the lower sump region 478; and a dump valve assembly 522.

The relief valve assembly 506 more particularly includes a perforated retainer 524 that is secured in the upper end of a tubular extension 526 of the housing 422 extending upwardly into the reservoir space 514 as best seen in FIGS. 16 and 18. A coil spring 528 in engagement with the retainer 524 presses downwardly on the head of a guide pin 530 which is biased downwardly against a ball check element 532 so as to maintain it in a tight fluid seal relationship with a seat at the upper end of the vertical passageway 492.

The dump valve assembly 522 more particularly includes a tubular housing 534 that has an externally threaded head 536 threadably received within an upwardly inclined internally threaded portion 538 of the housing. The head 536 is slotted at 540 to enable the housing 534 to be axially adjusted within a downwardly inclined opening 542 in the housing portion 538 that intersects with the lower sump region 478.

The tubular housing 534 is open ended, one end thereof being closed by a ball plug 544 and the opposite end thereof being bent over to define a valve seat 546 on which is seated a ball check element 548 to close an opening 549. Element 548 is held in place thereon by a coil spring 550 located within the interior of the housing 534 between the ball plug 544 and the ball check 548. A restricted bleed opening 552 in the side wall of the housing 534 communicates with an annular opening 554 formed between the tubular housing 534 and the housing 522. The annular opening 554 is sealed by a pair of spaced apart, annular seal members 556, 558 located in the outer surface of the tubular housing 534 on either end of the annular opening 554.

The vertically directed passageway 492 intersects the annular opening 554 to provide a path from the conduit openings 494, 496 in the housing 422 through which hydraulic fluid can be dumped from the connected jack units thence to flow through the restricted bleed opening 552. This provides a regulated dump action of the type pointed out in the previous embodiments. Thence fluid will flow through the interior of the tubular housing 534 and into the sump region 478 during periods when the dump check valve 548 is moved from its seated position.

Other phases of operation of this embodiment of the invention substantially correspond to those discussed with reference to the previously described embodiment. During periods when the vehicle is level the actuator arm 442 will assume a horizontal position seen in FIG. 19. This will locate the cam 430 as seen in FIGS. 17 and 18. This cam position locates a relatively flat part of the upper pumping profile 456 in engagement with the lower end of the pumping piston 458 thereby to limit the degree or distance travelled by the piston 458 during most phases of operation of the assembly 420.

When the actuator arm 442 is moved upwardly and angularly of the position shown in solid lines in FIG. 19, the cam 430 would be moved clockwise to an illustrated dotted line position where road induced movements that oscillate the arm 442 will result in a greater travel of the piston 458 with a commensurately increased fluid discharge from the assembly 452 for reasons previously discussed in the description of the first two embodiments of the invention.

When the vehicle is unloaded requiring dumping of the leveling jack units, the actuator arm 442 will be rotated below the position shown in solid lines of FIG. 19 and this will cause the cam 430 to rotate in a counterclockwise direction so that the nose 454 on the center segment 452 thereof will pass across the end of the tubular housing 534 located within the lower sump region 478. This lifts the ball check 548 from its seat whereby hydraulic fluid can flow from the jack units through the conduits connected to the outlet openings 494, 496 thence through the vertical passageway 492 and across the bleed opening 552 for eventual passageway into the sump region 478.

Under conditions where excessive pressure builds up in the passageway 492, the ball check 532 will be moved upwardly against the biasing action of the spring 528 to allow the pump to operate and merely discharge directly back to the reservoir 514 which is communicated by the cross-over passageway 520 with the sump region 478 to complete the by-pass path. The crossover passageway 520 corresponds to cross-over passageway 474 in the first embodiment of the invention.

While preferred embodiments of the present invention have been shown and described, it will be obvious to those skilled in the art that various modifications and substitutions may be made without departing from the spirit of the invention which is to be limited only within the scope of the appended claims.

We claim:

1. An automatic vehicle leveling system comprising a sprung mass, an unsprung mass, spring means disposed between said masses for resiliently supporting said masses with respect to one another, hydraulic jack means disposed between said sprung and unsprung masses in series with said spring means including means for leveling said sprung mass with respect to said unsprung mass, a pump housing connected to one of said masses, said housing including means defining a pump cylinder and a hydraulic sump, means defining an inlet to said pump cylinder and an outlet therefrom, conduit means for connecting said hydraulic jack means to said pump cylinder outlet, a piston in said cylinder movable therein to draw fluid from said pump cylinder inlet and for discharging fluid therefrom through said outlet to said hydraulic jack means, a piston operator located within said sump including first cam means thereon engageable with said piston for moving it with respect to said pumping cylinder to produce said aforementioned pumping action, a linkage connected to said piston operator connecting it to the other of said masses, said first cam means including a first surface configuration thereon moved into engagement with said piston by said linkage when the vehicle spring is deflected by heavy loading for producing a long stroke movement between said piston and said pumping cylinder causing a high rate of fluid flow through said outlet means to said hydraulic jack means for quickly leveling the vehicle, said cam means including a second surface configuration moved by said linkage into engagement with said piston when the vehicle is level for producing a short stroke piston action to reduce fluid flow from the outlet of said pump cylinder into said hydraulic jack means during high amplitude motions between said sprung and unsprung masses and to reduce wear between said piston and said pump cylinder during periods when the vehicle is level.

2. An automatic vehicle leveling system comprising a sprung mass, an unsprung mass, spring means disposed between said masses for resiliently supporting said masses with respect to one another, hydraulic jack means disposed between said sprung and unsprung masses in series with said spring means including means for leveling said sprung mass with respect to said unsprung mass, a pump housing connected to one of said masses, said housing including means defining a pump cylinder and a hydraulic sump, means defining an inlet to said pump cylinder and an outlet therefrom, conduit means for connecting said hydraulic jack means to said pump cylinder outlet, a piston in said cylinder movable therein to draw fluid from said pump cylinder inlet and for discharging fluid therefrom through said outlet to said hydraulic jack means, a piston operator located within said sump including first cam means thereon engageable with said piston for moving it with respect to said pumping cylinder to produce said aforementioned pumping action, a linkage connected to said piston operator connecting it to the other of said masses, said first cam means including a first surface configuration thereon moved into engagement with said piston by said linkage when the vehicle spring is deflected by heavy loading for producing a long stroke movement between said piston and said pumping cylinder causing a high rate of fluid flow through said outlet means to said hydraulic jack means for quickly leveling the vehicle, said cam means including a second surface configuration moved by said linkage into engagement with said piston when the vehicle is level for producing a short stroke piston action to reduce fluid flow from the outlet of said pump cylinder into said hydraulic jack means during high amplitude motions between said sprung and unsprung masses and to reduce wear between said piston and said pump cylinder during periods when the vehicle is level, said piston operator including second cam means thereon, valve means for dumping hydraulic fluid from said jack means to said sump including a movable element engageable with said second cam means, said piston operator responding through said linkage in response to a predetermined movement between said sprung and unsprung masses produced by said spring means when the vehicle is unloaded to cause said movable element to condition said valve means to dump fluid from said hydraulic jack means to said sump to compensate for said spring means produced unloading movement between said masses and thereby maintain a predetermined desired level relationship between said masses.

3. An automatic vehicle leveling system comprising a sprung mass, an unsprung mass, spring means disposed between said masses for resiliently supporting said masses with respect to one another, hydraulic jack means disposed between said sprung and unsprung masses in series with said spring means including means for leveling said sprung mass with respect to said unsprung mass, a pump housing connected to one of said masses, said pump housing including means defining a pump cylinder and a hydraulic sump, means defining an inlet to said pump cylinder and an outlet therefrom, conduit means for connecting said hydraulic jack means to said pump cylinder outlet, a piston in said cylinder movable therein to draw fluid from said pump cylinder inlet and for discharging fluid therefrom through said outlet to said hydraulic jack means, a piston operator located within said sump including first cam means thereon engageable with said piston for moving it with respect to said pumping cylinder to produce said aforementioned pumping action, a linkage connected to said piston operator connecting it to the other of said masses, said first cam means including a first surface configuration thereon moved into engagement with said piston by said linkage when the vehicle spring is deflected by heavy loading for producing a long stroke movement between said piston and said pumping cylinder causing a high rate of fluid flow through said outlet means to said hydraulic jack means for quickly leveling the vehicle, said cam means including a second surface configuration moved by said linkage into engagement with said piston when the vehicle is level for producing a short stroke piston action to reduce fluid flow from the outlet of said pump cylinder into said hydraulic jack means during high amplitude motions between said sprung and unsprung masses and to reduce wear between said piston and said pump cylinder during periods when the vehicle is level, said piston operator including second cam means thereon, valve means for dumping hydraulic fluid from said jack means to said sump including means defining a bore in said pump housing intersecting said sump, a tubular member in said bore having an open end, means adjustably locating said tubular member in said bore for axial movement therein so as to vary the position of said open end in said sump, a valve seat at said open end, a valve element closing said seat having a portion thereon engageable by said second cam means, said piston operator responding through said linkage in response to a predetermined movement between said sprung and unsprung masses produced by said spring means when the vehicle is unloaded to cause said second cam means to lift said valve element from said seat to dump fluid from said hydraulic jack means to said sump to compensate for said spring means produced unloading movement between said masses and thereby maintain a predetermined desired level relationship between said masses, said tubular member having a flow restriction through its walls upstream of said valve element interposed to control the rate of fluid dumped from said jack means to said sump.

4. An automatic vehicle leveling system comprising a sprung mass, an unsprung mass, spring means disposed between said masses for resiliently supporting said masses with respect to one another, hydraulic jack means disposed between said sprung and unsprung masses in series with said spring means including means for leveling said sprung mass with respect to said unsprung mass, a pump housing connected to one of said masses, said housing including means defining a pump cylinder and a hydraulic sump, means defining an inlet to said pump cylinder and an outlet therefrom, conduit means for connecting said hydraulic jack means to said pump cylinder outlet, a piston in said cylinder movable therein to draw fluid from said pump cylinder inlet and for discharging fluid therefrom through said outlet to said hydraulic jack means, a piston operator located within said sump including first cam means thereon engageable with said piston for moving it with respect to said pumping cylinder to produce said aforementioned pumping action, a linkage connected to said piston operator connecting it to the other of said masses, said first cam means including a first surface configuration thereon moved into engagement with said piston by said linkage when the vehicle spring is deflected by heavy loading for producing a long stroke movement between said piston and said pumping cylinder causing a high rate of fluid flow through said outlet means to said hydraulic jack means for quickly leveling the vehicle, said cam means including a second surface configuration moved by said linkage into engagement with said piston when the vehicle is level for producing a short stroke piston action to reduce fluid flow from the outlet of said pump cylinder into said hydraulic jack means during high amplitude motions between said sprung and unsprung masses and to reduce wear between said piston and said pump cylinder during periods when the vehicle is level, said piston operator including second cam means thereon, valve means for dumping hydraulic fluid from said jack means to said fluid reservoir including a dump bore in said pump housing in communication with said sump means forming a valve seat in said dump bore, a valve element engageable with said seat for blocking fluid flow from said bore to said sump, an elongated valve lifter in said bore having one end thereof supported by said piston operator and the opposite end thereof engageable with said valve element said piston operator responding through said linkage in response to a predetermined movement between said sprung and unsprung masses produced by said spring means when the vehicle is unloaded to lift said valve from said seat to dump fluid from said hydraulic jack means to said sump to compensate for said spring means produced unloading movement between said masses and thereby maintain a predetermined desired level relationship between said masses.

5. A vehicle leveling system comprising a piston cylinder leveling unit adapted to be connected between a sprung and an unsprung mass of a vehicle for maintaining a desired height relationship therebetween, a hydraulic pump for supplying fluid to said leveling unit in response to relative movement between the sprung and unsprung masses, conduit means fluidly connecting said leveling unit to said pump, said hydraulic pump including a housing adapted to be connected to one of said masses, a large diameter bore in said housing, an oscillatable operator member located within said housing bore including a lower peripheral surface thereon with a constant radius, linkage means connected to the other of said masses including means for arcuately moving said operator member in response to road induced movements between said masses and in response to vehicle attitude changes due to static load changes, said lower peripheral surface being supportingly and slidably received by said pump housing bore for relative arcuate movement with respect thereto, a cylindrical pump bore in said housing extending therethrough and intersecting said large diameter bore, a piston member slidably supported within said cylindrical bore for relative reciprocal movement with respect thereto, said oscillatable operator having an upper, outer periphery ing said piston in said pump bore upon arcuate movement in engagement with said piston member for reciprocating of said operator member, said upper outer periphery having a first radius surface thereon engaging said piston when the vehicle is level and moving said piston through a reduced stroke to limit pump output, a second radius surface on said upper outer periphery movable into engagement with said piston for producing a greater piston stroke during dynamic road induced movements between the sprung and unsprung mass when increased static loading conditions causes the vehicle attitude to vary from level means defining a sump within said housing, first valve means for communicating said cylindrical pump bore with said sump during an intake stroke of said piston member, second valve means communicating said cylindrical pump bore with said piston cylinder leveling unit upon a discharge stroke of said piston member, means connected to said pump housing forming a low pressure reservoir located axially above said cylindrical pump bore, relief valve means for sensing a predetermined maximum pressure buildup within said cylinder piston units and operative to divert fluid discharged from said pump cylinder directly into said low pressure reservoir, and means for dumping said cylinder and piston units including a dump cam surface on said oscillatable operator movable when the vehicle is unloaded, dump valve means in said housing including a movable element engaged by said dump cam and moved thereby upon the occurrence of a light loading relationship between the sprung and unsprung masses of a vehicle to cause fluid from the cylinder and piston units to be returned to the sump in said pump housing.

6. A hydraulic pump for supplying fluid to a vehicle leveling unit through conduit means fluidly connecting the leveling unit to said pump and in response to relative movement between the sprung and unsprung masses of a vehicle, comprising a housing adapted to be connected to one of said masses, a large diameter bore in said housing, an oscillatable operator member located within said housing bore including a lower peripheral surface thereon with a constant radius, linkage means adapted to be connected to the other of said masses including means for arcuately moving said operator member in response to road induced movements between the masses and in response to vehicle attitude changes due to static load changes, said lower peripheral surface being supportingly and slidably received by said pump housing bore for relative arcuate movement with respect thereto, a cylindrical pump bore in said housing extending therethrough and intersecting said large diameter bore, a piston member slidably supported within said cylindrical bore for relative reciprocal movement with respect thereto, said oscillatable operator having an upper outer periphery in engagement with said piston member for reciprocating said piston in said pump bore upon arcuate movement of said operator member, said upper outer periphery having a first radius surface thereon engaging said piston when the vehicle is level and moving said piston through a reduced stroke to limit pump output, a second radius surface on said upper outer periphery movable into engagement with said piston for producing a greater piston stroke during dynamic road induced movements between the sprung and unsprung mass when increased static loading conditions causes the vehicle attitude to vary from level, means defining a sump within said housing, first valve means for communicating said cylindrical pump bore with said sump during an intake stroke of said piston member, second valve means communicating said cylindrical pump bore with said piston cylinder leveling unit upon a discharge stroke of said piston member, means connected to said pump housing forming a low pressure reservoir located axially above said cylindrical pump bore, relief valve means for sensing predetermined maximum pressure buildup within said cylinder piston units and operative to divert fluid discharged from said pump cylinder directly into said low pressure reservoir, and means for dumping said cylinder and piston units including a dump cam surface on said oscillatable operator movable when the vehicle is unloaded, dump valve means in said housing including a movable element engaged by said dump cam and moved thereby upon the occurrence of a light loading relationship between the sprung and unsprung masses of a vehicle to cause fluid from the cylinder and piston units to be returned to the sump portion of said pump unit.

References Cited

UNITED STATES PATENTS

| 3,122,378 | 2/1964 | Parilla | 280—6 |
| 3,186,730 | 6/1965 | Angell | 280—6 X |

PHILIP GOODMAN, Primary Examiner

U.S. Cl. X.R.

280—124